Dec. 28, 1965   D. R. P. JACKSON   3,226,282
FEEDING OF WEBS OF MATERIAL
Filed June 5, 1962   8 Sheets-Sheet 1

INVENTOR
Donald R.P. Jackson
BY
Watson, Cole, Grindle & Watson
ATTORNEYS

Dec. 28, 1965  D. R. P. JACKSON  3,226,282
FEEDING OF WEBS OF MATERIAL
Filed June 5, 1962  8 Sheets-Sheet 3

INVENTOR
Donald R.P. Jackson
BY
Watson, Cole, Grindle & Watson
ATTORNEYS

Dec. 28, 1965  D. R. P. JACKSON  3,226,282
FEEDING OF WEBS OF MATERIAL
Filed June 5, 1962  8 Sheets-Sheet 4

INVENTOR
Donald R.P. Jackson
BY
Watson, Cole, Grindle & Watson
ATTORNEYS

Dec. 28, 1965  D. R. P. JACKSON  3,226,282
FEEDING OF WEBS OF MATERIAL
Filed June 5, 1962  8 Sheets-Sheet 8
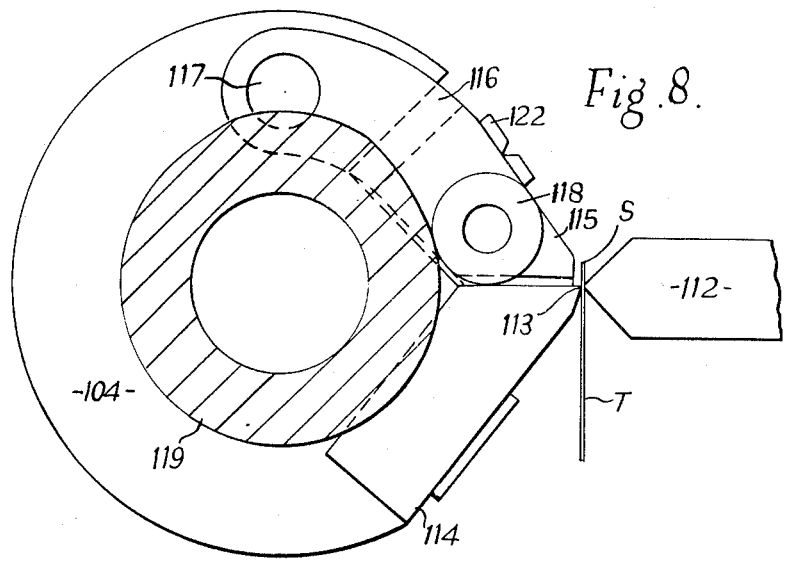
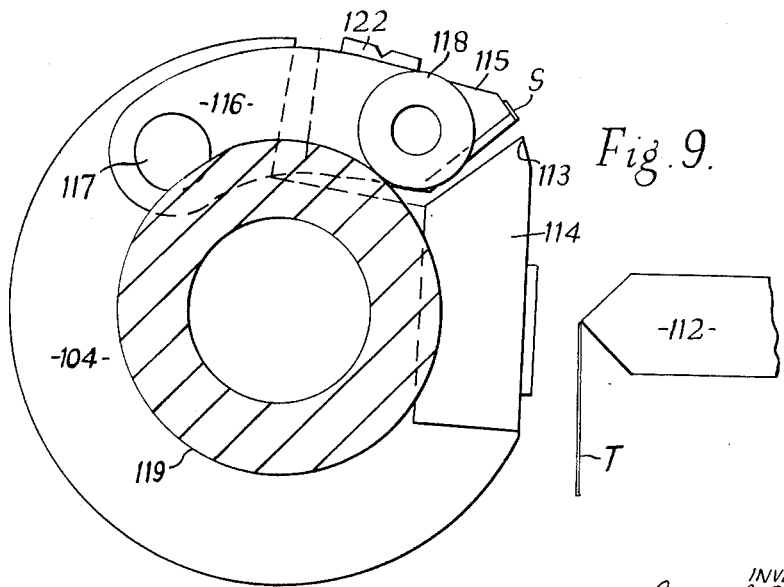
INVENTOR
Donald P. P. Jackson
BY
Watson, Cole, Grindle & Watson
ATTORNEYS

United States Patent Office 3,226,282
Patented Dec. 28, 1965

3,226,282
FEEDING OF WEBS OF MATERIAL
Donald Richard Patrick Jackson, Deptford, London, England, assignor to The Molins Organisation Limited, a British company
Filed June 5, 1962, Ser. No. 200,245
Claims priority, application Great Britain, June 14, 1961, 21,434/61; Feb. 22, 1962, 6,983/62
14 Claims. (Cl. 156—519)

This invention concerns improvements in or relating to the feeding of webs of material and in particular to the superimposition of a narrow strip, known as a tear-strip, to a web of material whilst the latter is being fed.

In wrapping articles, such as packages containing cigarettes, it is frequently the practice to feed a continuous web of wrapping material such as that known under the Registered Trade Mark "Cellophane," to superimpose thereon a narrow tear-strip, and to cut the wrapping material into suitable lengths for wrapping around the articles. The tear-strip is usually arranged to lie on the inside of the wrapping material (as considered when the article has been wrapped) and one end is arranged to project so that it can be pulled to tear the wrapper, whereby the article can readily be divested of its wrapping.

To provide wrappers with such tear-strips, it is often the practice to cut the tear-strip from a tape wound on a reel, the tape having the same width as the tear-strip and the length of tape to be cut being equal to the length of the tear-strip to be produced, and then to superimpose the tear-strip on the web of wrapping material. Such a method suffers from certain disadvantages. The reels of narrow tear-strip material are expensive, and, even if reels of wrapping material can be automatically joined to each other, with the object of preventing the machine being stopped so as to effect a hand joint, when one reel has nearly been exhausted, such automatic joining is not always possible with the narrow reels of tear-strip material.

Further, it is often desirable that the rate of feed of the web of wrapping material to which tear-strips are to be applied should be readily changeable (e.g. so that different lengths can be cut therefrom for a constant rate of working of the cutting mechanism). But it is also desirable that the rate of movement of the web of wrapping material through the tear-strip applying means during the time of application of a tear-strip should be substantially the same for all such different rates of feed of the web of wrapping material.

According to the present invention there is provided mechanism for producing a tear-strip and applying the tear-strip to a web of wrapper material, in which a tear-strip is severed from a web of tear-strip material by cutting the latter transversely of its length, comprising means to continuously feed the wrapper web past a rotatable member, a movable knife arranged to co-act with a fixed knife to sever a strip of the tear-strip material from its web, and transfer means connected to the rotatable member to hold the severed strip and move it into contact with the wrapper web so that it can be joined thereto.

The width of the web of tear-strip material may be the same as the length of tear-strip to be applied, and the movable knife may be connected to the rotatable member.

Solvent may be applied to lie between the web and the tear-strip when the latter is applied to the former. The wrapper web may be fed over a roller having a ridge running along its cylindrical surface, the ridge co-acting with a wick to apply a stream of solvent to the web at the position at which the tear-strip is to be applied thereto.

The said transfer means may be arranged to hold the severed strip suctionally. The wrapper web may be fed around part of the periphery of the rotatable member. The transfer means may comprise a part connected to the rotatable member and arranged to be movable relative thereto so as to be capable of moving the severed strip outwardly, with a radial component of movement in relation to the rotatable member, and into contact with the wrapper web.

The transfer means may be arranged to hold the severed strip in contact with, and move it at the same speed as the wrapper web for a period of time during the rotation of the rotatable member, and there may be provided an element arranged to move at substantially the same speed as the wrapper web while a tear-strip is applied to the latter, and positioned so that the wrapper web travels between the said element and the rotatable member, whereby the said element provides a counter surface against which the wrapper web can be pressed as a tear-strip is applied thereto.

The mechanism may comprise heating means to heat the tear-strip and wrapper web as the former is joined to the latter. The heating means may be arranged to move in the same direction and at substantially the same speed as the material to be joined for a period of time during the joining operation. The material to be joined may be held between the transfer means and the heating means for the said period of time. The heating means may be arranged to oscillate so as to move in the same direction and at substantially the same speed as the material to be joined for the said period of time, and so as to move in the opposite direction and return to its original position after the said period of time, and may be arranged to oscillate about the axis of rotation of the rotatable member.

The heating means may comprise an electrically heated element in the form of a flat band, the said band being mounted on a support comprising a movable part in contact with the band and spring urged so as to tension the latter. The band may press on the material to be joined, and said support may further comprise yieldingly mounted parts arranged to bear on the band so that the pressure exerted by the latter on the material to be joined is substantially constant along its length.

Further according to the invention there is provided mechanism for producing a tear-strip and applying the tear-strip to a web of wrapper material, comprising means to continuously feed the wrapper web past a rotatable member, a movable knife mounted on the rotatable member so as to be capable of co-acting with a fixed knife to cut a web of tear-strip material transversely of its length and sever a tear-strip therefrom, means to feed the web of tear-strip material past the fixed knife, a bar running parallel to the axis of rotation of the rotatable member and connected to the latter so as to be capable of moving with a radial component of movement relative thereto, a cam to cause movement of the bar relative to the rotatable member at desired times, and means to apply suction through a longitudinal face of the bar at desired times, whereby, on rotation of the rotatable member, the movable knife co-acts with the fixed knife to sever a tear-strip from the web of tear-strip material, the tear-strip is received on and suctionally held to the said face of the bar, the bar is then moved outwardly with a radial component of movement relative to the rotatable member by the action of the cam so that the tear-strip is moved into contact with the wrapper web and is held in such contact for a period of time, the rate of rotation of the rotatable member being such that the tear-strip is moved at the same speed as the wrapper web during the said period of time, suction through the bar being cut-off after the said period time so that the tear-strip is released thereby. The mechanism may further comprise an electrically heated element in the form of a flat band mounted on a support, the said support being arranged to oscillate about the axis of rotation of the rotatable member in timed relationship with the latter, and the said band being parallel with the said axis of rotation, and wherein the wrapper web is fed between the said band and the rotatable member so that the severed strip and the wrapper band are held in contact between the said bar and the said band and heated during the said period of time, the oscillation of the said support being such that the band moves at the same speed as the wrapper web during the said period of time, and returns to its original position after the said period of time.

Still further according to the present invention there is provided mechanism for continuously feeding a web of wrapper material to which tear-strips are applied, comprising feed means (e.g. feed rollers) to continuously feed a wrapper web at a constant rate, and means to apply tear-strips to the wrapper web, the said feed means being positioned beyond the position of the tear-strip applying means (considered in the direction of movement of the wrapper web) and being adaptable to be capable of feeding the wrapper web at different rates (e.g. by means of a change gear), there being provided intermittent feed means between the two said positions, the said intermittent feed means being arranged to feed the wrapper web during the time of application of a tear-strip thereto at the fastest rate of feed of the first said feed means, whereby the rate of movement of the wrapper web through the tear-strip applying means during the time of application of a tear-strip is substantially the same for different rates of feed of the wrapper web from the first said feed means.

The said intermittent feed means may comprise a continously driven segmental roller arranged to co-act with a further roller, the wrapper web being gripped between the two rollers and fed thereby during the time of application of a tear-strip.

Mechanism in accordance with the invention will now be described by way of example with reference to the accompanying drawings, in which.

Figure 1:
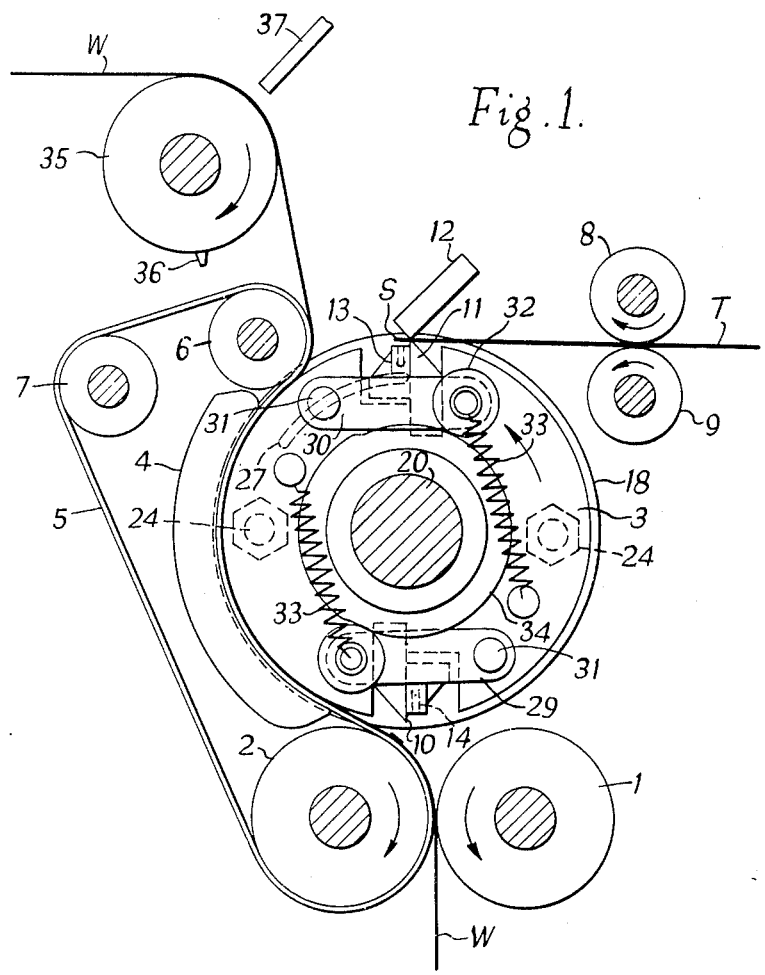
FIGURE 1 is an end elevation of one embodiment.
Figure 3:
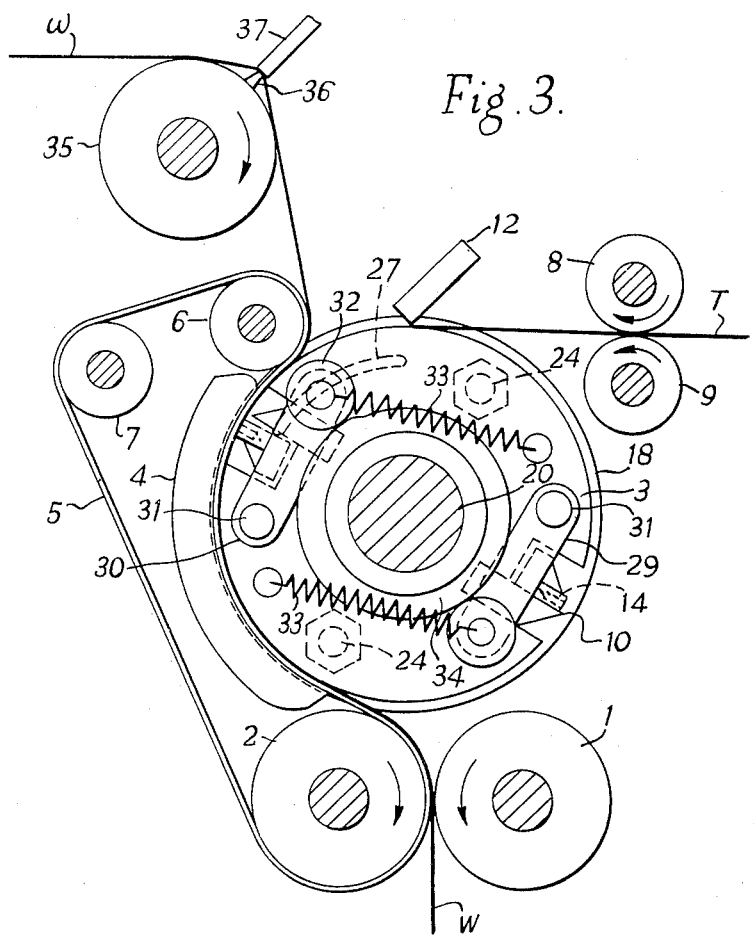
Figure 4:
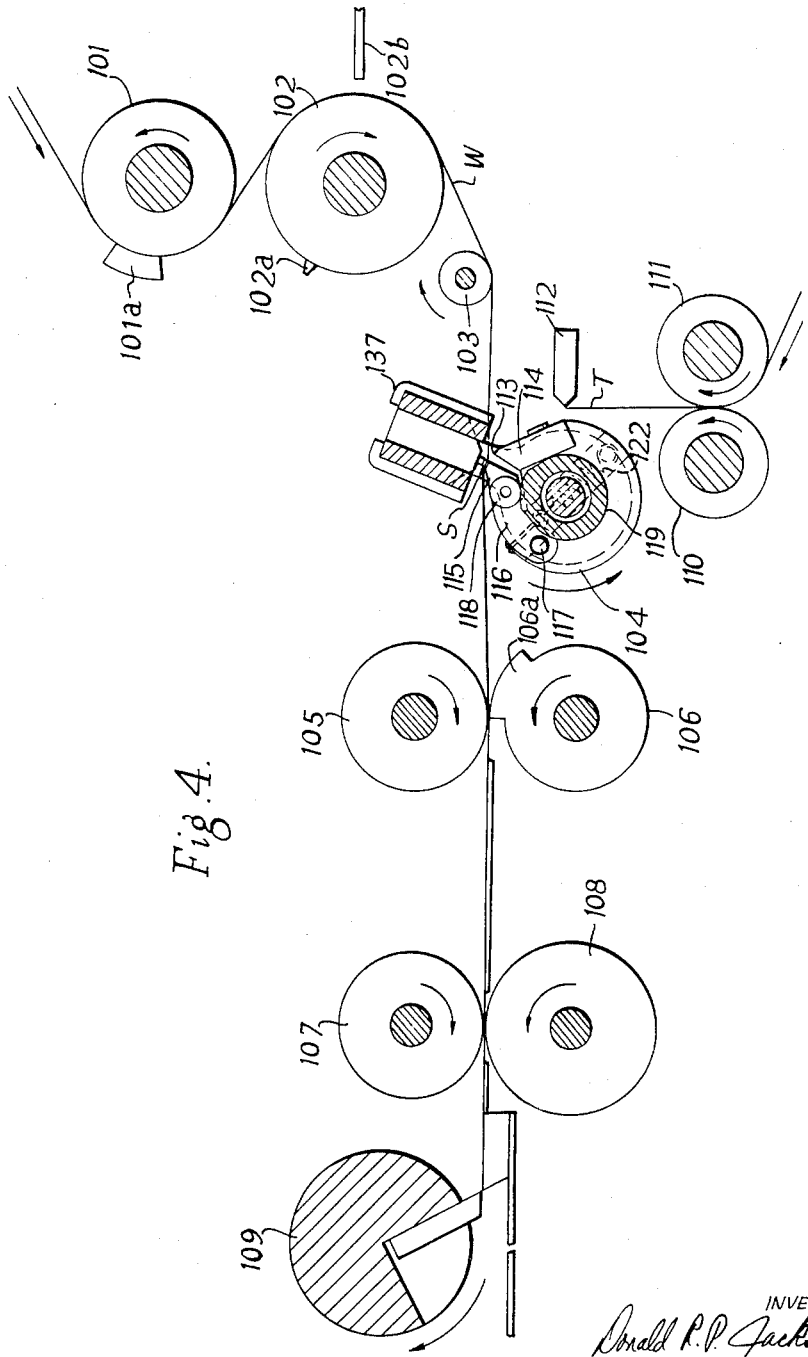
Figure 5:
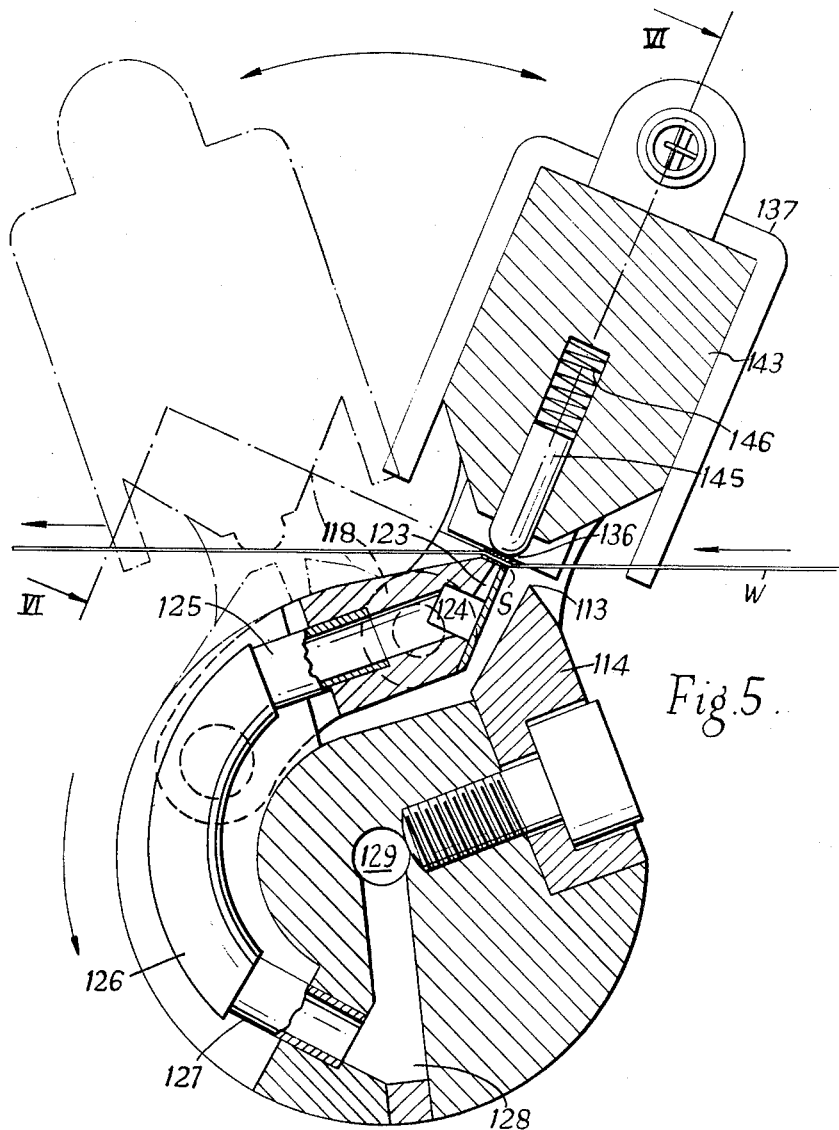
Figure 6:
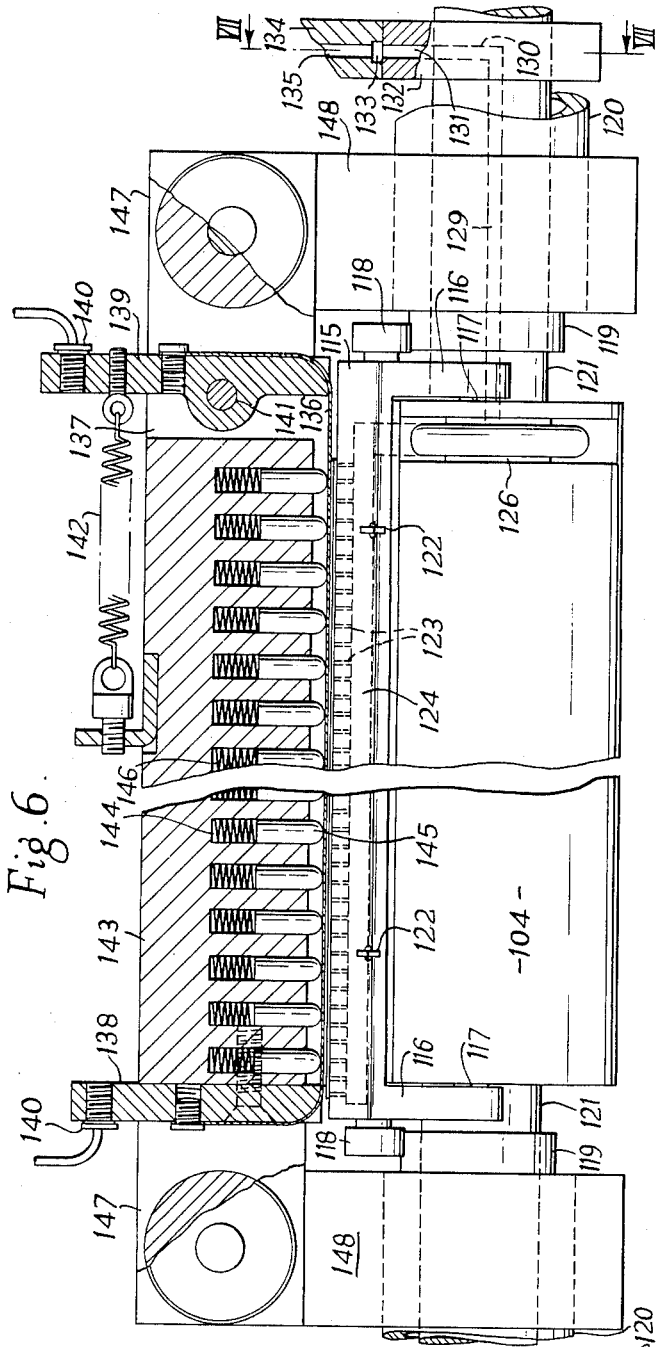
Figure 7:
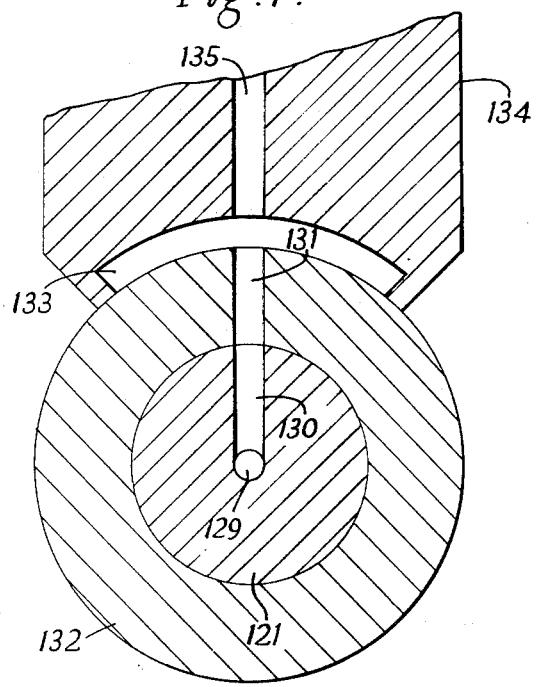

FIGURE 3 is a further end elevation in which part of the mechanism has moved to another position than that shown in FIGURE 1, FIGURE 4 is an end elevation of a further embodiment, FIGURE 5 is a part of FIGURE 4, drawn to a larger scale and partly in section, FIGURE 6 is a side elevation partly in section on the line VI–VI of FIGURE 5, FIGURE 7 is a sectional view on the line VII–VII of FIGURE 6, FIGURES 8 and 9 show part of FIGURE 4 drawn to a larger scale and in different positions.

Referring to FIGURE 1, a web of cellophane W is continuously fed by two feed rollers 1 and 2 in the direction shown by the arrows on the rollers. Immediately before being fed through the nip of the rollers 1 and 2 to web W passes around part of the cylindrical surface of a combined cutting and tear-strip applying cylinder 3, opposed to which is a counter-member 4. Between the counter-member 4 and the cylinder 3 a movable endless belt 5 is driven by the feed roller 2 and passes over a tail roller 6 and a tensioning roller 7.

A continuous web of tear-strip material T, whose width is equal to the final length of the tear-strip to be superimposed on the wrapper, is intermittently fed through two feed rollers 8 and 9 in the direction indicated by the arrows of rotation. The intermittent feed of the rollers 8 and 9 is such that strip S of length equal to the desired width of the tear-strip is fed forward just before the cutting edge 10 of a moving knife 11 located in and fixed to the cylinder 3 co-acts with the cutting edge of a fixed knife 12 thus severing the strip S from the web T. There are two such knives 11 held in the cylinder 3 and the feed of the web T is effected twice for every revolution of the cylinder 3.

Figure 2:
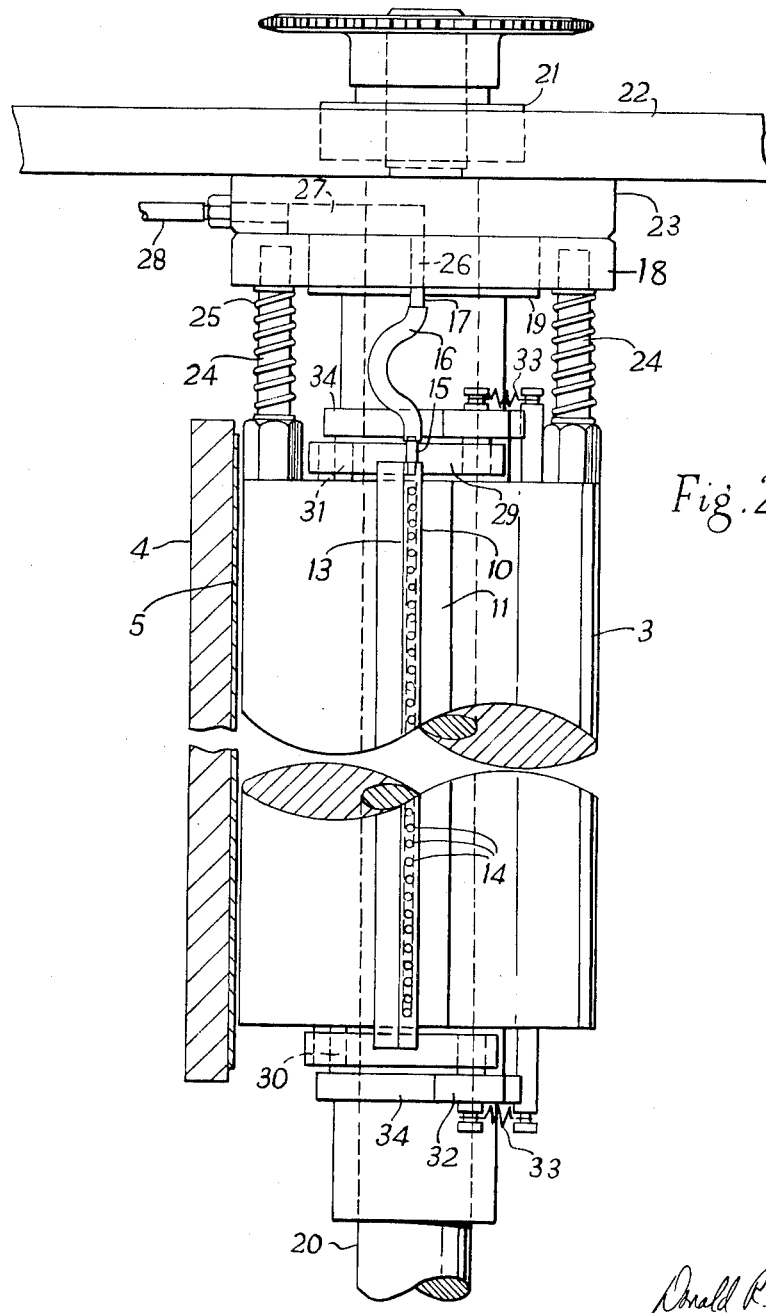
FIGURE 2 is a plan of FIGURE 1.

Immediately in front of the knife 11, considered in the direction of rotation of the cylinder 3, is a bar 13 provided with suction ports 14 along its length. The ports 14 communicate with a longitudinal hole running the length of the bar 13 and communicating with a projecting pipe 15, FIGURE 2, which is connected by means of a length of flexible hose 16 to a further pipe 17 secured to a moving ring 18. The ring 18 is bored to fit on a flange 19 of a shaft 20 to which the cylinder 3 is keyed. One end of the shaft 20 is journalled at 21 to a main frame member 22 of the apparatus. Fixed to the member 22 is a fixed ring 23 of the same diameter as the moving ring 18, which latter is attached by means of two posts 24 to the cylinder 3. The posts 24 have springs 25 fitted so that the face of the moving ring 18 is held against the face of the fixed ring 23. A hole 26 is drilled through the ring 18 and connects with the pipe 17. The fixed ring 23 is provided with an arcuate chamber 27, see FIGURES 1 and 2, which is connected via a pipe 28 to a source of suction which is not shown.

The bar 13 is carried at its two ends on arms 29 and 30 which are each pivoted at one end 31 to the cylinder 3, and provided with a cam-roller 32 at the other end. The cam-roller 32 is held by means of a spring 33 against a cam track 34. Thus as the cam rollers 32 lift against the action of the springs 33 the bar 13 moves radially outward towards the position it occupies in FIGURE 3. During movement of the bar 13 from the position shown in FIGURE 1, the hole 26 in the ring 18 is in communication with the arcuate suction chamber 27 until just before the bar 13 reaches the position shown in FIGURE 3. Thus the bar 13 forces the strip S, which it is holding suctionally, against the web W as soon as the strip S is opposite the web W. When the bar reaches the position shown in FIGURE 3, suction is cut off from the ports 14 of the bar 13 and the strip S is no longer suctionally held on the bar.

Before the web reaches the cylinder 3 it passes over a driven roller 35 having a ridge 36 along its cylindrical face. This ridge 36 forces the web against a wick 37 which is of equal length and is parallel to the ridge 36 and which is in contact with a suitable solvent.

The operation of the apparatus will now be described. The web W is fed continuously and the web T intermittently, to the cylinder 3 whose peripheral speed is the same as that of the web W. The web W is fed by the feed rollers 1 and 2 and has applied to it a transverse stream of solvent from the wick 37 against which the desired portion of the web is lifted into contact by the ridge 36. The intermittent action of the feed rollers 8 and 9 is so timed that a strip S is fed forward in time for the knife 11 and the fixed knife 12 to sever the strip S into the desired length which, once cut from its web T, falls onto the suction face of the bar 13 to which it is rigidly held. In this position the ports 14 of the suction bar are in direct communication with the suction source through the arcuate chamber 27 and the hole 26. The timing of the roller 35 is such that the stream of solvent is applied to the web W in a position which will ensure that the strip S and the stream of solvent will meet as the web reaches the surface of the cylinder 3.

At the same time as the strip S and the stream of solvent meet, the cam roller 32 lifts on the track 34 and thus raises the bar 13 towards the position in which it is shown in FIGURE 3. In its raised position the suction face of the bar 13 is slightly proud of the surface of the cylinder 3 so that pressure is applied by it onto the strip S and the web W, this pressure being taken by the counter-member 4 over which the endless band 5 runs at the same speed as the web, the band 5 providing a moving counter surface against which the web W is pressed. When the cylinder has rotated to the position shown in FIGURE 3 the hole 26 moves from communication with the arcuate chamber 27, thus cutting off suction from the holes 14. The strip S is now free from the surface of the bar 13 which holds it firmly against the web and the solvent, thus causing adhesion.

The cylinder 3 is provided with two knives 11, suction bars 13 and bar lifting mechanisms. Thus the feed rollers 8 and 9 are arranged to move intermittently twice for each revolution of the cylinder 3. The solvent stream applying roller 35 similarly rotates twice for every revolution of the cylinder.

It will be appreciated that, if desired, heat-sealing material of the known type could be used for both web W and tearstrip material T, in which case the roller 35 and the wick 37 would not be required, and heat could be supplied by using the counter-member 4 for this purpose. Alternatively, the roller 35 and wick 37 could be retained in the mechanism to apply solvent to the web W, and heat could be supplied to assist in joining the strip S to the web W and to dry the solvent.

Referring now to FIGURES 4 to 9, which illustrate a further embodiment, and initially to FIGURE 4, a web W of wrapping material passes about a guide roller 101, a driven roller 102 and a further guide roller 103. In conjuction with the guide roller 101 there is provided a braking pad 101a, which acts as a tensioning device for the web W. The driven roller 102 has a ridge 102a which runs axially along its cylindrical face. This ridge 102a forces the web W against a wick 102b which is of equal length and is parallel to the ridge 102a and which is in contact with a suitable solvent. Thus, as the web W passes about the roller 102 a stream of solvent is applied across the width of the web on each revolution of the roller 102.

After leaving the guide roller 103 the web W travels past a rotatable member 104, between a roller 105 and a segmental roller 106, whose purpose will be described later, and then between feed rollers 107 and 108 to a rotary cutting device 109. The feed roller 108 is driven at a desired constant rate so that desired lengths of wrapping material can be cut from the web W by the cutting device 109.

A continuous web T of tear-strip material, whose width is equal to the length of tear-strip to be applied, is intermittently fed through the two feed rollers 110 and 111 past a fixed knife 112. The intermittent feed of the rollers 110 and 111 is such that a strip S, of length equal to the desired width of a tear-strip is fed past the knife 112 just before the cutting edge 113 of a movable knife 114 fixed on the rotatable member 104 co-acts with the cutting edge of the fixed knife 112.

Immediately in front of the knife 114, considered in the direction of rotation of the member 104, is a bar 115 which runs along the length of the member 104 and has end projections 116 which are pivoted at 117 to the member 104 (see also FIGURE 6). Rollers 118, mounted on each end of the bar 115, cooperate with cams 119 fixed to stationary sleeves 120 which are concentric with a shaft 121 (FIGURE 6) which forms part of the rotatable member 104. Springs 122, connected to the bar 115 and the member 104, hold the rollers 118 in constant engagement with the cams 119.

Referring now to FIGURES 5, 6 and 7, the bar 115 is provided with suction ports 123 along its length, which communicate with a longitudinal hole 124. The hole 124 communicates with a projecting pipe 125, which is connected by means of a length of flexible hose 126 to a further pipe 127. The pipe 127 leads into the member 104 (FIGURE 5) and communicates by a duct 128 with a chamber 129 running axially through the centre of the shaft 121.

The chamber 129 communicates through a passage 130 with a hole 131 bored through a disc 132 keyed to the shaft 121. The hole 131 can register with an arcuate groove 133 cut in a stationary member 134 (FIGURES 6 and 7). The groove 133 is connected through a channel 135 to a suction pump (not shown), so that when the hole 131 registers with the groove 133 suctional pressure is applied at the ports 123, but when the hole 131 moves out of communication with the groove 133 and free of the member 134, it is open to the atmosphere and suctional pressure is relieved.

Referring now to FIGURE 6, above the rotatable member 104 is mounted a heating element in the form of a flat band 136 whose width is approximately equal to the width of a tear-strip. The band 136 is mounted on a support 137 having electrically conducting end members 138 and 139 to which electrical connections are made at terminals 140. The member 139 is pivoted at 141 to the support 137, so as to be movable relative thereto, and is urged by a spring 142 to tension and to accommodate for heat expansion of the band 136. Between the end members 137 and 139 is a part 143, made of electrically insulating material and having channeled recesses 144 in which members 145 are yieldingly mounted on springs 146. The members 145 are made of heat-resistant material, and bear on the band 136 so that the pressure exerted thereby along its length is substantially constant.

The support 137 has forked extensions 147 connected to collars 148 rotatably mounted on the stationary sleeves 120, and is arranged to oscillate in a manner which will be described later.

The support 137 is spring urged to rotate in one direction and the collars 148 are provided with a cam surface having a recessed portion which is adapted to be engaged by a prominent portion of a continuously rotatable cam (not shown). Thus the support 137 is arranged to oscillate by rotation in one direction under spring action and under control by means of the cam surfaces, and rotation in the opposite direction by engagement of the said prominent portion with the said recessed portion.

The operation of the mechanism described so far is as follows:

The web W is continuously fed by the feed rollers 107 and 108 and the web T is intermittently fed by the rollers 110 and 111 as already described.

In passing about the driven roller 102, the web W has a stream of solvent applied across its width, at a position where a tear-strip is to be applied, by the co-action of the ridge 102a and the wick 102b, in a manner as previously described.

The member 104 is continuously rotated anti-clockwise as viewed in FIGURES 4 and 5, and as the cutting edge 113 of the knife 114 approaches the knife 112, the hole 131 moves into communication with the groove 133 (FIGURE 7) and suctional pressure is applied through the ports 123 in the bar 115, which at that time is in contact with the knife 114.

Referring now to FIGURES 8 and 9, the knives 114 and 112 then co-act to sever the strip S from the web T (the strip S having been fed past the knife 112, as previously described). As can be seen from FIGURE 8, the cutting edge 113 of the knife 114 projects slightly beyond the bar 115 at the time of cutting. The severed strip S is then suctionally held to the bar 115 which, on the continued rotation of the member 104, is moved upwardly and outwardly from the cutting edge 113 (see FIGURE 9) under the action of the cams 119. The severed strip S is then brought into contact with the web W at the position where a stream of solvent has been applied. It will be appreciated that by this arrengement the cutting edge 113 can be prevented from contacting the web W, on which it might otherwise have a damaging effect. The parts are then in the position shown in FIGURES 4 and 5, and the strip S is held in contact with the web W between the bar 115 and the heating band 136, the band 136 providing a counter-surface against which the web W is pressed.

The band 136 is then rotated (anti-clockwise as viewed in FIGURES 4 and 5) on its support 137 about the same centre and at the same speed of rotation as the member 104 by rotation of the collars 148 about the sleeves 120. Thus the strip S is held in contact with the web W between the bar 115 and the heating band 136 until the parts reach the position shown in dot and dash line in FIGURE 5, during which time the strip S is sealed to the web W. The speed of rotation of the member 104 is arranged to be such that the parts in contact with the strip S and the web W during the time of sealing move at the same speed as the web W. The hole 131 then moves out of communication with the groove 133 (FIGURE 7) and free of the member 134 so that suctional pressure at the ports 123 is relieved and the strip S is released.

The member 104 continues to rotate and the bar 115 is moved back into contact with the knife 114 under the action of the springs 122 and the cams 119. The support 137 is rotated clockwise as viewed in FIGURE 5 until it returns to its original position, shown in full line in FIGURES 4 and 5, when the cutting edge 113 of the knife 114 re-approaches the knife 112 and the operational cycle is continuously repeated.

It will again be appreciated that by the use of suitable materials for the webs W and T, the tear-strip can be joined to the wrapper web by heat-sealing alone, in which case the solvent applying means can be omitted from the mechanism.

It may be desired to feed the web W at different rates (e.g. so that different lengths of wrapping material can be cut from the web W by the cutting device 109), and this can readily be achieved by the application of a change gear to the drive of the feed roller 108. However, in order to avoid complicated changes and adjustments to the whole mechanism, it is desirable that the speed of rotation of the member 104 should remain the same for all such different rates of feed of the web W.

For this purpose further feed rollers 105 and 106 are provided (FIGURE 4), the roller 106 being a segmental roller having a projecting segmental portion 106a. The member 104 is continually rotated at a speed corresponding to the fastest desired rate of feed of the web W. The roller 106 is also driven at the fastest desired speed of the feed roller 108, and the segmental portion 106a is arranged to engage the web W during the time of application of a tear-strip S thereto. Thus, when a change gear is applied to the drive of the feed roller 108, so that the web W is fed thereby at a slower rate, the rollers 105 and 106 will feed the web W through the tear-strip applying mechanism at the fastest rate (i.e. the rate corresponding to the speed of rotation of the member 104) whenever a tear-strip is being applied. During this time of application of a tear-strip a slight slack will build up in the web W at a position between the rollers 105 and 106 and the rollers 107 and 108, but immediately after the application of a tear-strip the portion 106a of the roller 106 will disengage the web W, which will therefore cease to be fed thereby, and the slack will be removed by the feed of the rollers 107 and 108. The braking pad 101a, on the guide roller 101 acts as a tensioning device for the web W during its acceleration and deceleration.

It will be understood that, where the solvent applying means is included in the mechanism, the diameter of the driven roller 102 must also be changed for a different rate of feed of the web W, and that the web W will then move about the roller 102 at a greater speed than that of its peripheral surface during the time of application of a tear-strip (i.e. during the time of faster feed by the roller 106). For this reason the position of the roller 102 has to be adjusted so that the ridge 102a does not engage the web W during this time. However, where the solvent applying means is omitted, only one change need be made to the mechanism in order to feed the web W at a different rate. It will be appreciated that by this arrangement a desired different rate of feed of the wrapper web can readily and easily be achieved.

What I claim as my invention and desire to secure by Letters Patent is:

1. Mechanism for producing a tear strip and applying it to a web of wrapper material, in which a tear strip is severed from a web of tear strip material by cutting the latter transversely of its length, said mechanism comprising a rotatable member, a transfer member carried by said rotatable member and having a surface provided with suction ports, means to feed the said web of tear strip material so that its leading end extends over said surface, means to sever from said web a strip of the web extending over said surface, means to apply suction to said ports to hold the said strip to said surface, means to feed a web of wrapping material past said rotatable member, means to move the said transfer means outwardly of the said rotatable member toward the said web of wrapping material to press the said strip against the said wrapping material, and means operative thereafter to cut off suction from the said ports.

2. Mechanism as claimed in claim 1, wherein the wrapper web is fed around part of the periphery of the rotatable member.

3. Mechanism as claimed in claim 1, wherein there is provided an element arranged to move at substantially the same speed as the wrapper web while a tear-strip is applied to the latter, and positioned so that the wrapper web travels between the said element and the rotatable member, whereby the said element provides a counter surface against which the wrapper web can be pressed as a tear-strip is applied thereto.

4. Mechanism as claimed in claim 1, comprising heating means to heat the tear-strip and wrapper web as the former is joined to the latter.

5. Mechanism as claimed in claim 4, including means to move the heating means in the same direction and at substantially the same speed as the material to be joined for a period of time during the joining operation.

6. Mechanism as claimed in claim 5, wherein the material to be joined is held between the transfer member and the heating means for the said period of time.

7. Mechanism as claimed in claim 6, including means to oscillate the heating means so as to move the latter in the same direction and at substantially the same speed as the material to be joined for the said period of time, and so as to move the heating means in the opposite direction and return it to its original position after the said period of time.

8. Mechanism as claimed in claim 7, wherein the heating means is arranged to oscillate about the axis of rotation of the rotatable member.

9. Mechanism as claimed in claim 4, wherein the heating means comprises an electrically heated element in the form of a flat band, the said mechanism also comprising a support on which the said band is mounted, the said support comprising a movable part in contact with the band and spring-urged so as to tension the latter.

10. Mechanism as claimed in claim 9, wherein the band presses on the material to be joined, the said support comprising yieldingly mounted parts arranged to bear on the band so that the pressure exerted by the latter on the material to be joined is substantially constant along its length.

11. Mechanism for producing a tear-strip and applying the tear-strip to a web of wrapper material, comprising means to continuously feed the wrapper web past a rotatable member, a movable knife mounted on the rotatable member so as to be capable of co-acting with a fixed knife to cut a web of tear-strip material transversely of its length and sever a tear-strip therefrom, means to feed the web of tear-strip material past the fixed knife, a bar running parallel to the axis of rotation of the rotatable member and connected to the latter so as to be capable of moving with a radial component of movement relative thereto, a cam to cause movement of the bar relative to the rotatable member at desired times, and means to apply suction through a longitudinal face of the bar at desired times, whereby, on rotation of the rotatable member, the movable knife co-acts with the fixed knife to sever a tear-strip from the web of tear-strip material, the tear-strip is received on and suctionally held to the said face of the bar, the bar is then moved outwardly with a radial component of movement relative to the rotatable member by the action of the cam so that the tear-strip is moved into contact with the wrapper web and is held in such contact for a period of time, the rate of rotation of the rotatable member being such that the tear-strip is moved at the same speed as the wrapper web during the said period of time, suction through the bar being cut-off after the said period time so that the tear-strip is released thereby.

12. Mechanism as claimed in claim 11, comprising a support and an electrically heated element in the form of a flat band mounted on the said support, the said support being arranged to oscillate about the axis of rotation of the rotatable member in timed relationship with the latter, and the said band being parallel with the said axis of rotation, and wherein the wrapper web is fed between the said band and the rotatable member so that the severed strip and the wapper band are held in contact between the said bar and the said band and heated during the said period of time, the oscillation of the said support being such that the band moves at the same speed as the wrapper web during the said period of time, and returns to its original position after the said period of time.

13. Mechanism for producing tear strips and applying them to a web of wrapping material, comprising a rotatable carrier, a transfer member carried by said carrier and having a surface provided with suction ports, and movable outwardly of said carrier to a transfer position and inwardly to a receiving position, a cutter member carried by said carrier behind said transfer member and projecting outwardly of said carrier beyond the said surface when said transfer member is in its receiving position, means to feed a web of tear strip material over said cutter member so that its leading end extends over said surface, a knife located adjacent said carrier and arranged to coact with said cutter member to cut from said web of tear strip material a strip located over said surface, means to feed a web of wrapping material past said carrier, means operative after a cut strip has been received on said surface to move the transfer member outwardly beyond the edge of said cutter member and toward the said wrapping material to press the said strip against it, and means operative to apply suction to the said suction ports to hold the said strip to the said surface, and to cut off the suction when the said strip has been transferred to the web of wrapping material.

14. Mechanism as claimed in claim 1, comprising means to apply solvent at spaced intervals to the web of wrapping material as the latter approaches the rotatable member, said means including a roller about which the web passes, a solvent applicator spaced from said roller, and a ridge on the peripheral surface of said roller and projecting from said surface far enough to bring a portion of the web into contact with said applicator whenever said ridge moves past the applicator.

References Cited by the Examiner

UNITED STATES PATENTS

| | | | |
|---|---|---|---|
| 2,335,033 | 11/1943 | Tompkins | 156—519 |
| 2,528,856 | 11/1950 | Caldwell | 156—552 |
| 2,743,753 | 5/1956 | Graves | 156—552 |
| 2,990,081 | 6/1961 | Neui et al. | 156—519 |

EARL M. BERGERT, *Primary Examiner.*

DOUGLAS J. DRUMMOND, *Examiner.*